United States Patent [19]
Duncan et al.

[11] Patent Number: 5,170,829
[45] Date of Patent: Dec. 15, 1992

[54] RETRACTABLE PALLET RACK GUARD

[75] Inventors: Charles W. Duncan, Costa Mesa, Calif.; John F. Starr, Middle Haddam, Conn.; John B. Ebbesmeyer, Manchester, Conn.; Barry A. Cole, Colchester, Conn.

[73] Assignee: Sinco Incorporated, East Hampton, Conn.

[21] Appl. No.: 656,498

[22] Filed: Feb. 19, 1991

[51] Int. Cl.⁵ .............................................. E06B 9/06
[52] U.S. Cl. .................................. 160/84.1; 160/194; 211/191
[58] Field of Search .................... 160/84.1, 194, 193, 160/195, 330, 332, 184; 211/180, 189, 183, 191

[56] References Cited

U.S. PATENT DOCUMENTS

| | | | |
|---|---|---|---|
| 1,649,748 | 11/1927 | Scott | 160/195 X |
| 2,754,900 | 7/1956 | Karobonik et al. | 160/84.1 X |
| 3,964,781 | 6/1976 | Fenton | 160/84.1 X |
| 4,194,549 | 3/1980 | Lovgren | 160/84.1 |
| 4,683,933 | 8/1987 | Dunbar | 160/84.1 X |
| 4,727,919 | 3/1988 | Kraeutler | 160/84 |
| 4,981,225 | 1/1991 | Cole | 211/180 X |

Primary Examiner—Blair M. Johnson
Attorney, Agent, or Firm—Chilton, Alix & Van Kirk

[57] ABSTRACT

A rack guard for a pallet rack employs a retractable safety net. The net is clipped to carriers which traverse along vertical tracks offset from the pallet rack. The tracks are pivotally mounted with respect to the pallet rack to permit pivotal displacement of the tracks to a position adjacent the support posts of the rack.

25 Claims, 6 Drawing Sheets

RETRACTABLE PALLET RACK GUARD

BACKGROUND OF THE INVENTION

This invention relates generally to net systems which are employed as safety barriers. More particularly, the present invention relates to safety net systems which are installed to pallet racks and the like.

Pallet racks have for a number of years provided a primary storage support structure in large warehousing, storage and distribution facilities. In such highly efficient modernized warehousing operations, fork lifts or other vehicles are commonly employed to load or remove loaded pallets from the pallet racks. Large retailing operations have also recently employed pallet racks to both store and display products in the retail showroom. As the size of the facilities has increased and the direct access of the public to pallet racks systems has increased, the damage potential due to accidental droppage or improper loading of the pallet racks has also escalated. There are also increased security problems associated with theft and vandalism of the contents of the pallet racks. Safety net systems have been installed to enhance the safety and minimize safety risks from mishandling or misloading of the pallet racks. A large number of conventional safety net systems are essentially custom installed safety net systems. Few, if any, conventional safety net systems have addressed security considerations for the pallet racks.

In U.S. Pat. No. 4,981,225 assigned to the assignee of the present invention, a universal safety net system which is especially adapted for installation to pallet racks employs extension members mounted to the pallet rack structure. The extension members are variably adjustable for extending the effective height of the pallet racks and the posts. Offset members which include a series of openings for implementing a pre-established offset spacing from the pallet rack are also employed. Adjustable cross-brace assemblies reinforce the offset members and the vertical extended members. Cables are then suspended between the offset members and/or extension members to provide a cable framework which supports the safety net.

For certain applications, it is advantageous that the safety net not be a fixed safety barrier but be retractable or removable during certain periods of time. For example, the safety net may be retracted to permit loading or unloading of the pallet rack and/or the net may be retracted to permit public access to the contents of the rack as desired. In addition to functioning as a safety barrier, the net may be employed as a rack guard to ensure the security of the contents.

SUMMARY OF THE INVENTION

Briefly stated, the invention in a preferred form is a retractable net guard system adapted for mounting to a pallet rack. The net guard system comprises a pair of laterally spaced vertically extending tracks. The tracks are mounted to the pallet rack in offset relationship to one side of the pallet rack. The carriers, which in a preferred embodiment, comprise a plurality of rollers traverse along the tracks. The rollers connect with clips which attach to the net. The net is vertically raised or lowered by either a motor mounted apparatus mounted generally above the pallet rack or a manually operated retracting mechanism.

In one embodiment, the system is configured so that the tracks may also be retracted to permit an unimpeded access to the pallet racks.

An object of the invention is to provide a new and improved retractable safety net for a pallet rack.

Another object of the invention is to provide a new and improved rack guard which is efficient and is relatively easy to install to a conventional pallet rack.

A further object of the invention is to provide a new and improved retractable net guard system which is adaptable for a pallet rack system and is transformable to a mode which allows unimpeded access to the pallet rack in a retracted net mode.

Other objects and advantages of the invention will become apparent from the drawings and the specification.

DETAILED DESCRIPTION OF THE PREFERRED EMBODIMENT

With reference to the drawings, wherein like numerals represent like parts throughout the figures, a pallet rack designated generally by the numeral 10 has been affixed with a retractable rack guard designated by the numeral 12. The rack guard employs a safety net 20 which is extendable in a guard mode (FIG. 2) to substantially cover a front face or side of the pallet rack. The net also upwardly or vertically retracts to provide access to the pallet rack through the front face. The pallet guard system is adapted for mounting to a wide variety of pallet racks. Multiple rack guard systems may be mounted for a given pallet rack installation.

Figure 1:
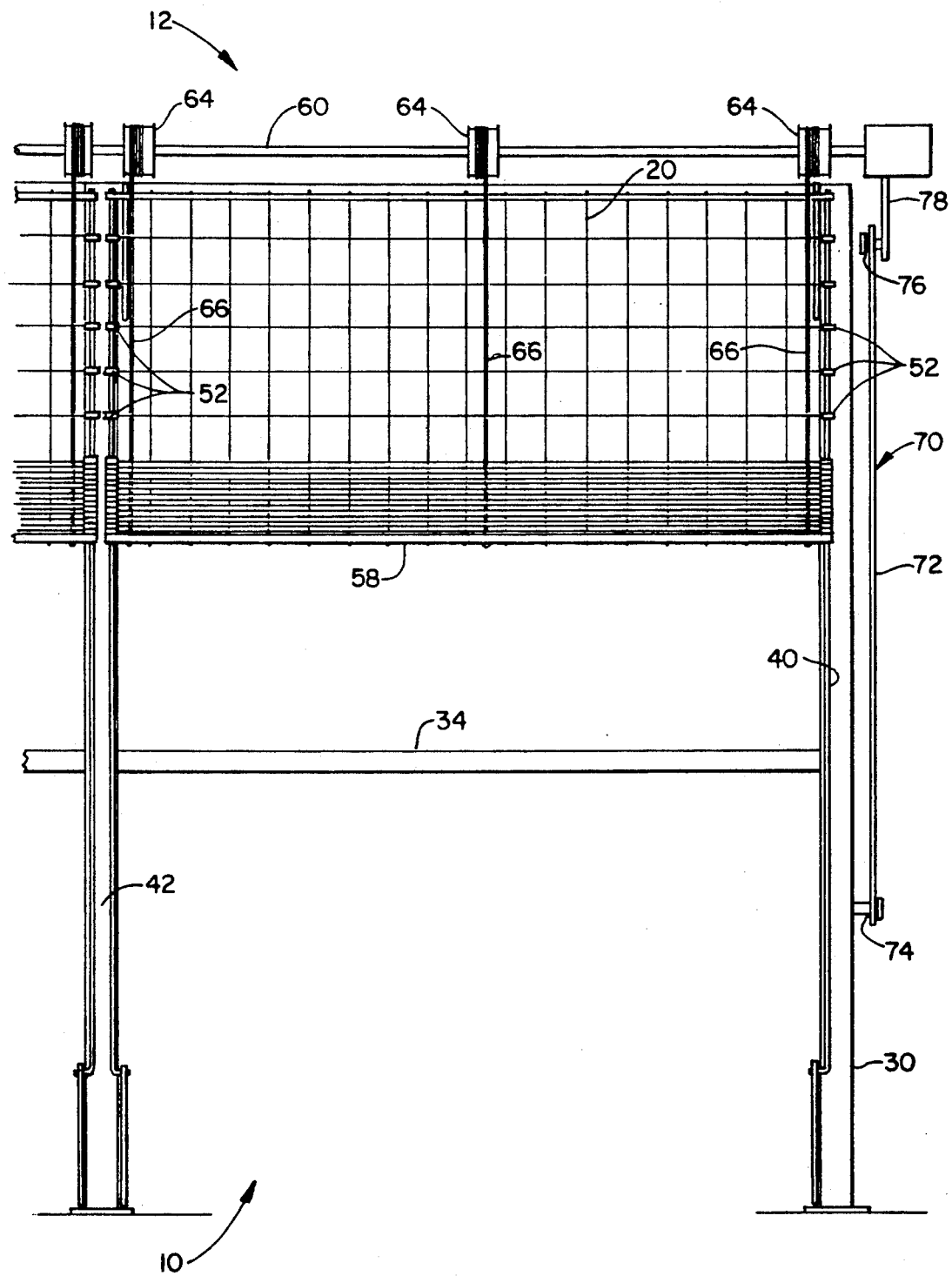
FIG. 1 is a fragmentary front view of a pallet rack and the retractable rack guard system in accordance with the present invention.
Figure 2:
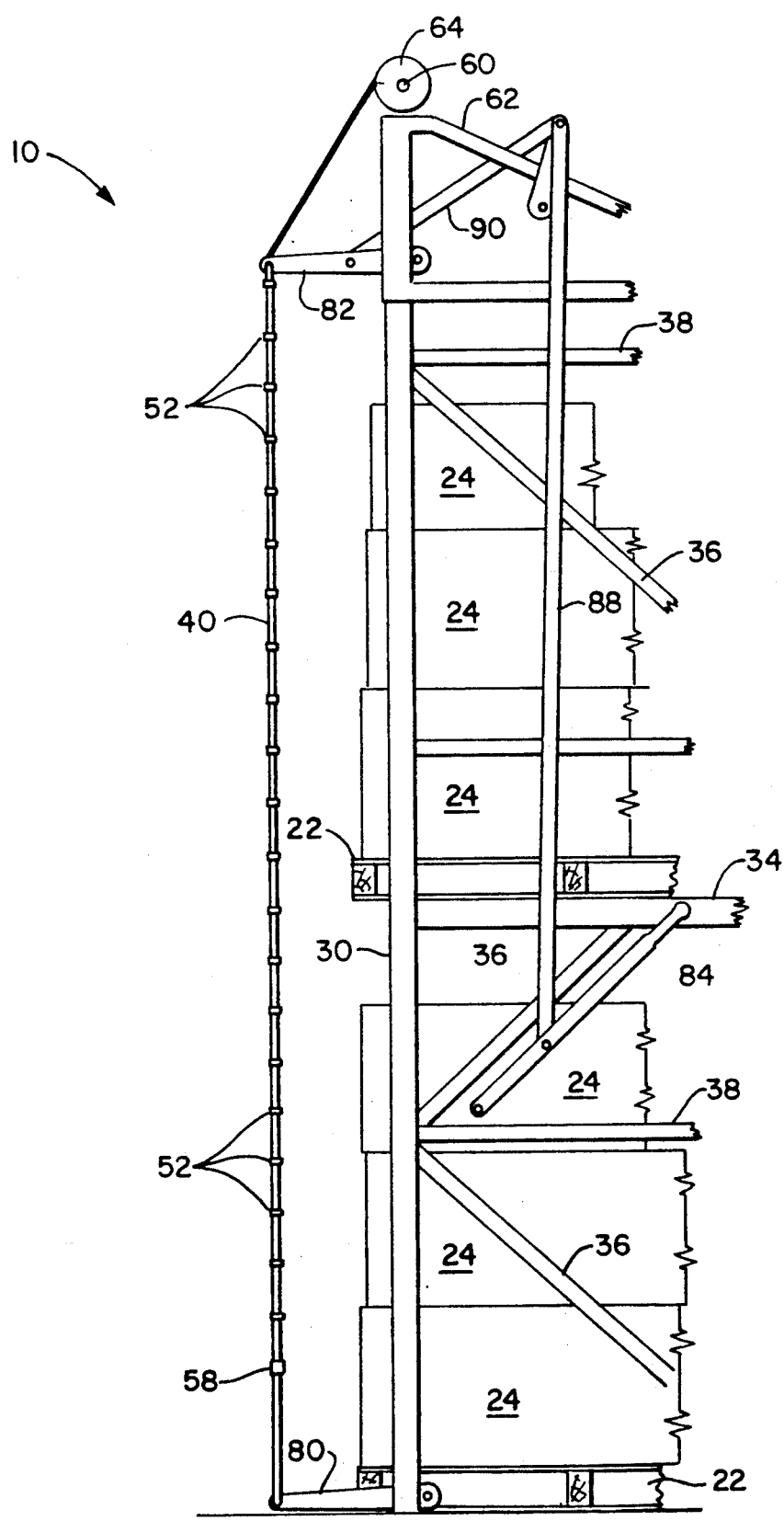
FIG. 2 is a fragmentary side elevational view of the pallet rack and rack guard system of FIG. 1 illustrated in a guard mode and further illustrating loaded pallet racks.

With reference to FIGS. 1–4, a prototypical pallet rack 10 comprises longitudinally spaced pairs of front and rear upright support post 30,32. Load beams 34 which extend laterally and from front to rear are supported by the support posts. Pallets 22 are ordinarily loaded cross-wise onto the load beams 34 from front to rear. Various packages or products 24 are supported on the pallets. Various bracing and reinforcing members 36,38 are also ordinarily provided to reinforce and stabilize the pallet rack. It should be noted that the pallets 22 frequently overhang or extend forwardly from the support posts 30,32 and the load beams 34 as illustrated in FIG. 2.

The safety net 20 functions as a safety barrier in case of misloading and/or accidental dislodgment of loads onto or off of a pallet rack. The retractable pallet rack guard 12 is adapted for mounting to a wide range of pallet rack shapes, sizes and load configurations. Accordingly, rack 10 is intended to be illustrative of numerous forms and types of pallet racks and other racks to which the safety system has application. Likewise, the retractable net guard may assume numerous configurations other than the specific illustrated retractable net guard described herein.

Figure 7:
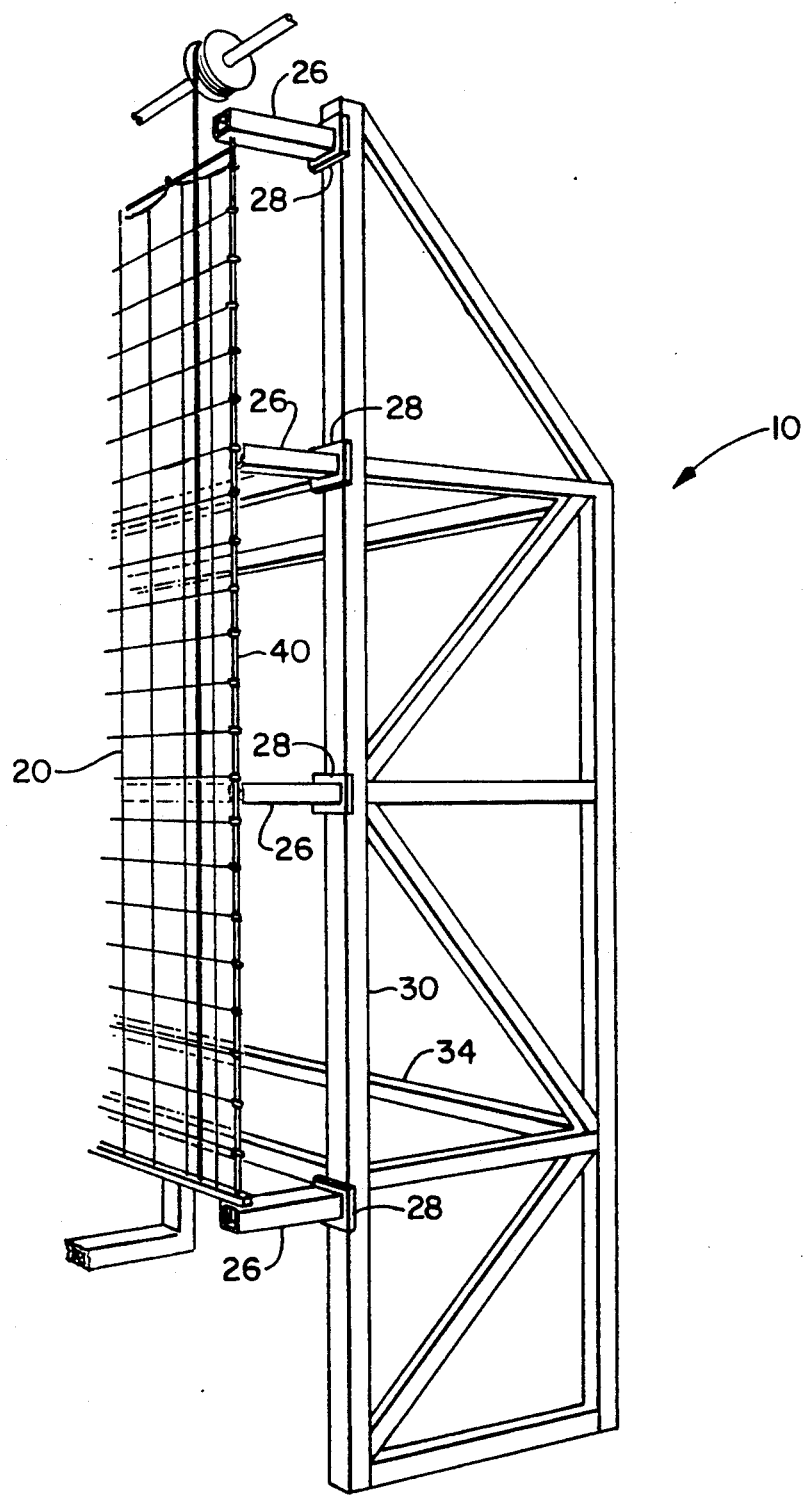
FIG. 7 is a fragmentary perspective view of a third embodiment of the retractable rack guard system illustrated in a guard mode.

Pairs of laterally spaced tracks 40,42 are mounted for vertical disposition so as to extend substantially the entire height of the pallet rack plus a pre-established height above the top of the rack. The tracks are mounted in offset relationship to the front support posts 30 and the load beams 34, so that interference with projecting overhanging pallets 22 is avoided. As will be detailed below, the tracks are preferably pivotally mounted to the pallet rack. In one embodiment (FIG. 7), the tracks 40,42 are fixedly mounted to the support posts by offset members 26 which attach to the support posts and extend forwardly. The offset members 26 are constructed of tubular steel tubes which are mounted to plates 28. The plates 28 are mounted to the posts, by U-bolts which are received in opposed openings of the plates. The tracks 40,42 are then bolted to the offset members.

The tracks 40,42 are preferably extruded members, and may, for example, be made of extruded aluminum. The end tracks 40 may be single track units while the intermediate tracks 42 are preferably tandem track units. For a given installation, multiple rack guard units may be installed along a row of pallet racks and thus there ma be two extreme end tracks 40 and multiple intermediate tracks 42.

Figures 5, 6:
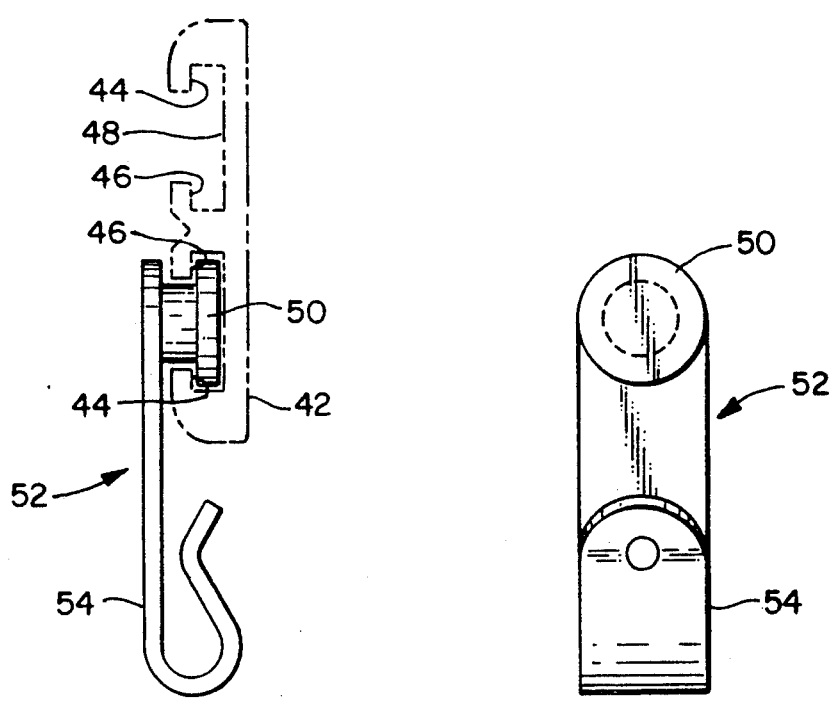
FIG. 5 is an enlarged sectional view of a track and a carrier for the retractable rack guard system of FIG. 1.
FIG. 6 is a side view of the carrier of FIG. 5.

With reference to FIGS. 5 and 6, the tracks have a pair of cooperative flanges 44,46 which define a uniform linear guide slot 48 for a roller 50 of a carrier 52. The roller 50 slides along the slot 48 and is confined thereto by the cooperative flanges 44, 46. The clip 54 extends from the roller and clips to the safety net 20. The clip has a shepard's crook configuration. It will be appreciated that multiple carriers 52 are mounted to each of the tracks so that the safety net is suspended at a multiplicity of laterally and vertically spaced connecting points.

The safety net is vertically and laterally dimensioned so that in the extended guard mode (FIG. 2), the net 20 extends to cover substantially the entire forward face of the pallet rack unit with the carriers 52 being substantially uniformly spaced along the vertical extent of the tracks 40,42. A bar 58 is attached at the bottom of the safety net 20. The bar 58 may be locked in a fixed lower portion of the pallet rack frame by a variety of means (not illustrated).

A shaft 60 is mounted at an upper frontal position above the pallet rack by means of a bearing assembly (not illustrated). The bearing assembly is mounted to a bracket 62 which is affixed at the top of the pallet rack. The shaft 60 mounts a plurality of drums 64 which are laterally spaced along the shaft. Cords 66 are wound on the drums and are anchored at one end to the bar 58. As the shaft 60 is rotated, the drums correspondingly rotate to either wind or unwind the cords 66 to raise or lower the net 20.

The shaft may be rotated by either a motor or by a manually operated device such as by a continuous loop/pulley arrangement 70 (FIG. 1). A loop 72 is suspended between a pair of pulleys 74,76 which rotatably couple via a belt 78 with the shaft 60. The net may then be raised and lowered by manually pulling on the appropriate side of the loop 72.

Because the tracks are forwardly offset from the pallet racks to accommodate the overhanging pallets, the tracks are exposed to being accidentally impacted by forklifts or other vehicles or by other objects or individuals in the aisles between the pallet racks. Consequently, it is very desirable for many applications that when the net 20 is in a retracted mode, the tracks 40,42 be pivoted into or toward the pallet rack.

Figure 3:
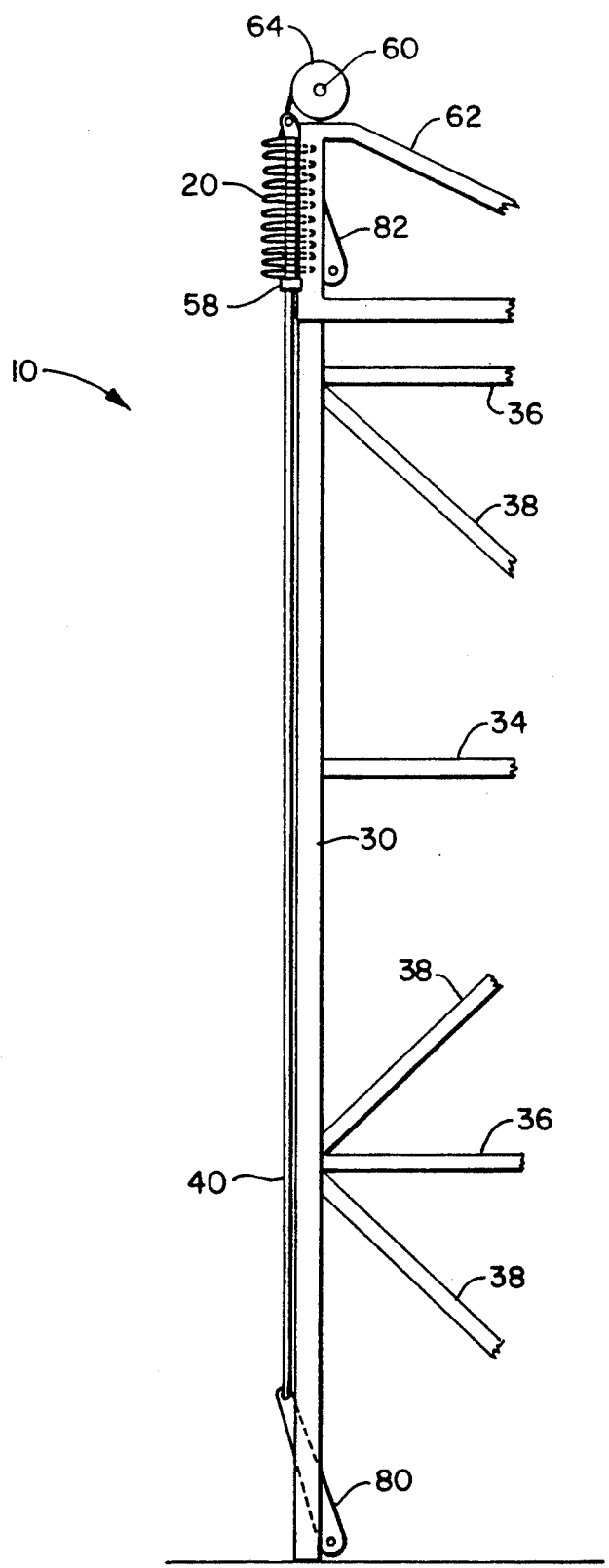
FIG. 3 is a fragmentary side elevational view of the rack guard system of FIG. 1 illustrated in a retracted mode.

With reference to FIGS. 2 and 3, the tracks 40,42 are preferably mounted to lower and upper pivot arms 80,82, which are in turn pivotally mounted to the pallet rack 10. A lever handle 84 is also pivotally mounted to the support rack structure. An intermediate portion of the lever handle pivotally connects with a transfer arm 88 which extends upwardly and pivotally connects with a connector link 90 to the upper pivot arm 80. Link 90 is pivotally connected to an intermediate position of the upper pivot arm. A downward clockwise torque (viewed in FIG. 2) on the lever handle 84 forces the upper pivot arm 82 and the lower followed pivot arm 80 to upwardly pivot. The tracks 40,42 are pivotally folded upwardly against the front support post 30 or adjacent pallet rack structure. In this fashion, the tracks may be pivoted out of the way when the net 20 is retracted and not in use. The tracks 40,42, arms 80,82 and the pallet rack 10 form a variable parallelogram-type pivoting relationship wherein the tracks maintain their vertical disposition regardless of the angular position of the arms.

Figure 4:
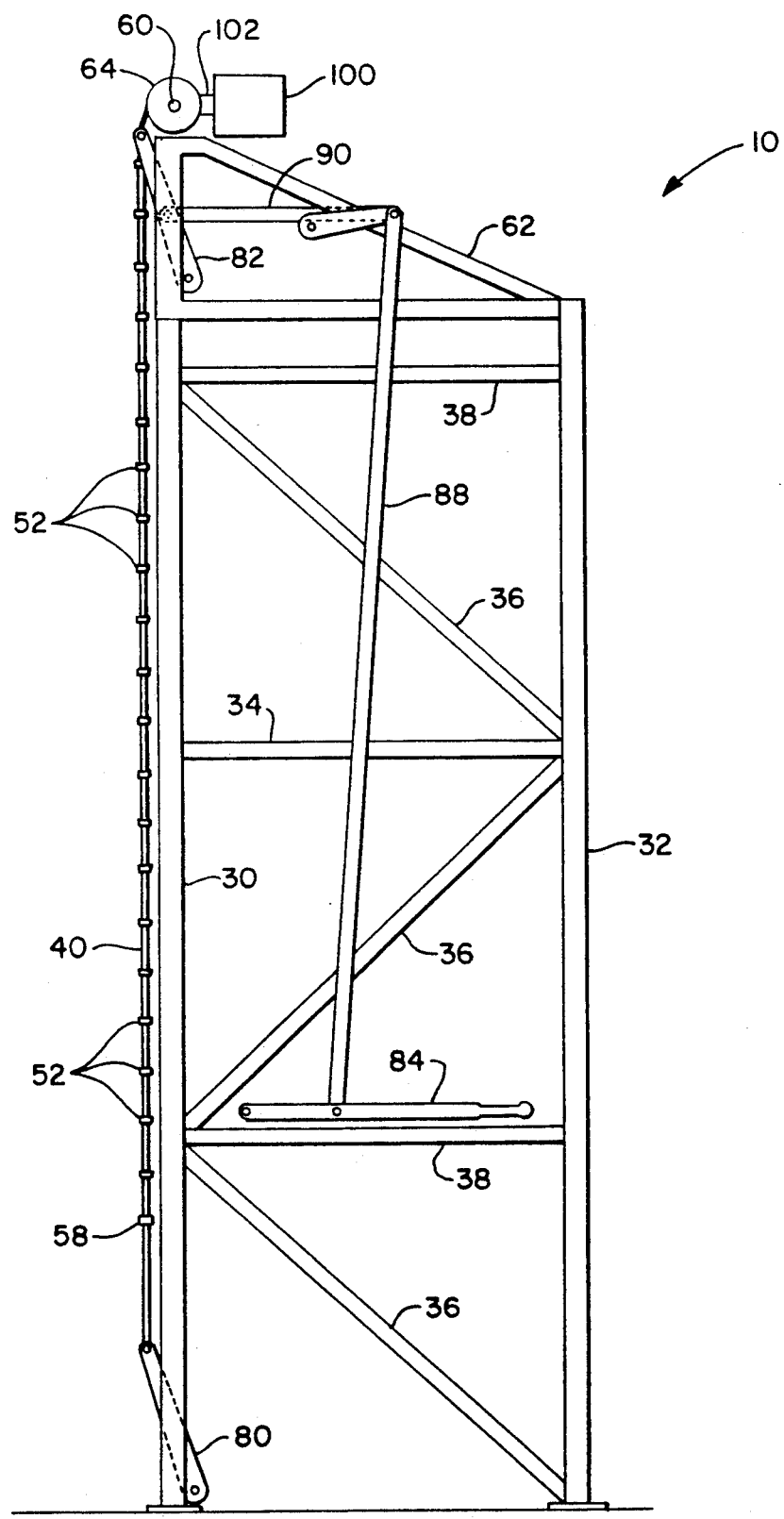
FIG. 4 is a side elevational view of a second embodiment of the retractable rack guard system illustrated in a retracted mode.

With reference to FIG. 4, the safety net may be raised or lowered by means of a motor 100. Motor 100 may essentially be a conventional automatic garage door type operator. The garage door operator may be oriented on its side with a sprocket chain assembly 102 engaging a drum mounted to the shaft 60 to raise or lower the shaft. In one embodiment, the motor is adjusted so that the full retraction (vertical lifting) of the net is accomplished by 36 full revolutions of the shaft.

The specific dimensions and number of retractable net guard units required for a given pallet rack system will vary in accordance with the specific dimensional and structural constraints of the pallet racks. In conventional warehousing type configurations, wherein multiple pallet racks are interconnected along an extended aisle, multiple rack guard units 12 will be assembled in side-by-side relationship. The rack guard systems could either be independently operable, i.e., to both retract or extend the safety net as well as to pivot the tracks against the pallet racks, and/or two or more of the units could be ganged, i.e., shafts operatively connected so that the nets would either be raised or lowered in multiple and/or the associated tracks 40,42 pivoted against the pallet rack in cooperative fashion.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A retractable rack guard system for a pallet rack of a type comprising a plurality of vertically spaced posts and having a front side thereof:

track means for forming a pair of linear tracks;

mounting means for mounting said tracks in offset relationship to said front side, said mounting means comprising a plurality of pivoted arms pivotally mounted to said track means;

a plurality of carrier means mounted to said track means for a vertical displacement therealong, said carrier means comprising a clip;

net means mounted to said clips and expandable for spanning an area across the front side in offset relationship thereto to form a barrier for said pallet rack and retractable to permit access to the front side of the rack; and retracting means for selectively displacing said carrier means along said track means for retracting said net means.

2. The rack guard system of claim 1 wherein said mounting means comprises a plurality of pivoted arms pivotally mounted to said track means.

3. The rack guard system of claim 1 wherein said carrier means comprises a roller which traverses in said track means.

4. The rack guard system of claim 1 wherein said track means further comprises a linear slot which is partially defined by a pair of opposed retainer flanges.

5. The rack guard system of claim 1 further comprising means for pivoting said track means between a first operative guard position and a second withdrawn position wherein said track means are substantially vertical in both said positions.

6. The rack guard system of claim 1 further comprising a shaft and at least one drum mounted to said shaft, a cord wound to said drum and connectable to said net for retracting and expanding said net.

7. The rack guard system of claim 1 further comprising motor means for driving said shaft.

8. The rack guard system of claim 5 further comprising a lever handle which is pivotal for pivoting said track means between said first and second positions.

9. A pallet rack system comprising:
a pallet rack having a plurality of vertical support posts and having a first side;
mounting means mounting a pair of linear tracks mounted in vertical laterally spaced relationship forwardly from said first side, said mounting means comprising a plurality of pivoted arms pivotally mounted to said track means.
a plurality of carriers displaceable along said tracks;
a safety net connected to said carriers and expandable to extend across said first side; and
retraction means for vertically raising said safety net for retracting said net to permit access to said first side.

10. The pallet rack system of claim 9 wherein said pivoted arms comprise upper and lower pivot arms pivotally mounting said tracks to said pallet rack so that said tracks may be positioned in an extended and a withdrawn position relative to said first side.

11. The pallet rack system of claim 10 further comprising a lever handle for pivoting said tracks between extended and withdrawn positions.

12. The pallet rack system of claim 9 wherein each said carrier comprises a roller and said track means comprises a pair of opposed flanges which partially define a slot, said roller being received in said slot.

13. The pallet rack system of claim 12 wherein each said carrier further comprises a clip having the general shape of a shepard's crook, said clip connecting said roller and being attachable to the net.

14. The pallet rack system of claim 9 wherein said retraction means comprises a rotatable shaft mountable at an upper portion of said rack.

15. The pallet rack system of claim 14 further comprising a plurality of drums mounted to said shaft and a cord wound to each said drum.

16. The pallet rack system of claim 15 further comprising a bar mounted to said net, said cords attached at one end to said bar.

17. The pallet rack system of claim 14 further comprising a motor for driving said shaft.

18. The pallet rack system of claim 14 further comprising a continuous loop which is manually displaceable for rotating said shaft.

19. A rack guard system for a pallet rack comprising:
a pair of tracks forming a linear guideway defined by a pair of flanges;
mounting means for mounting said tracks to a pallet rack in laterally spaced vertical disposition thereto, said mounting means further comprising a plurality of arms pivotally mounting said racks;
carrier means comprising a plurality of carriers received in said guideway and traversable therealong;
a safety net connectable with said carriers; and
retraction means for raising said safety net so that said carrier means are displaceable along said guideway.

20. A retractable rack guard system for a pallet rack of a type comprising a plurality of vertically spaced posts and having a front side thereof:
track means for forming a pair of linear tracks;
mounting means for mounting said tracks in offset relationship to said front side;
pivoting means for pivoting said track means between a first operative guard position and a second withdrawn position wherein said track means are substantially vertical in both said positions;
a plurality of carrier means mounted to said track means for vertical displacement therealong, said carrier means comprising a clip;
net means mounted to said clips and expandable for spanning an area across the front side in offset relationship thereto to form a safety barrier for said pallet rack and retractable to permit access to the front side of the rack; and
retracting means for selectively displacing said carrier means along said track means for retracting said net means.

21. The rack guard system of claim 20 wherein said carrier means comprises a roller which traverses in said track means.

22. The rack guard system of claim 20 wherein said track means further comprises a linear slot which is partially defined by a pair of opposed retainer flanges.

23. The rack guard system of claim 20 further comprising a shaft and at least one drum mounted to said shaft, a cord wound to said drum and connectable to said net for retracting and expanding said net.

24. The rack guard system of claim 20 further comprising motor means for driving said shaft.

25. The rack guard system of claim 20 further comprising a lever handle which is pivotal for pivoting said track means between said first and second positions.

* * * * *